Figure 3:
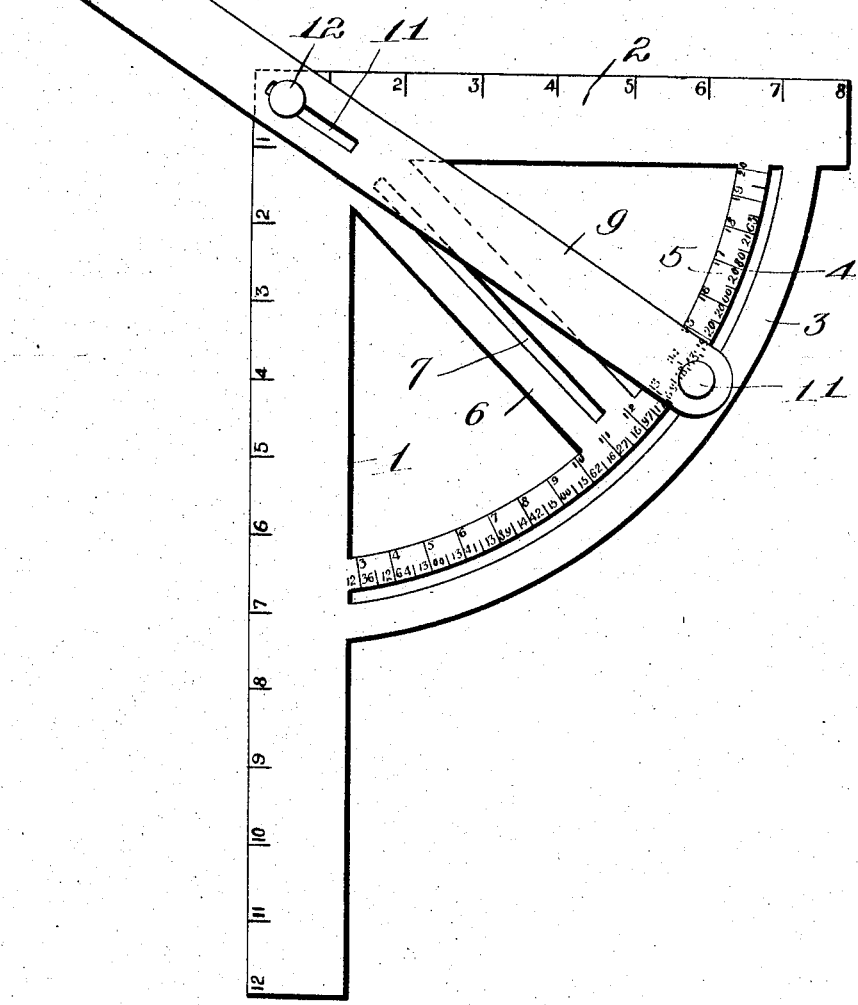

No. 780,954. PATENTED JAN. 24, 1905.
R. L. McCARTNEY.
COMBINATION MEASURING INSTRUMENT.
APPLICATION FILED APR. 5, 1904.
2 SHEETS—SHEET 1.
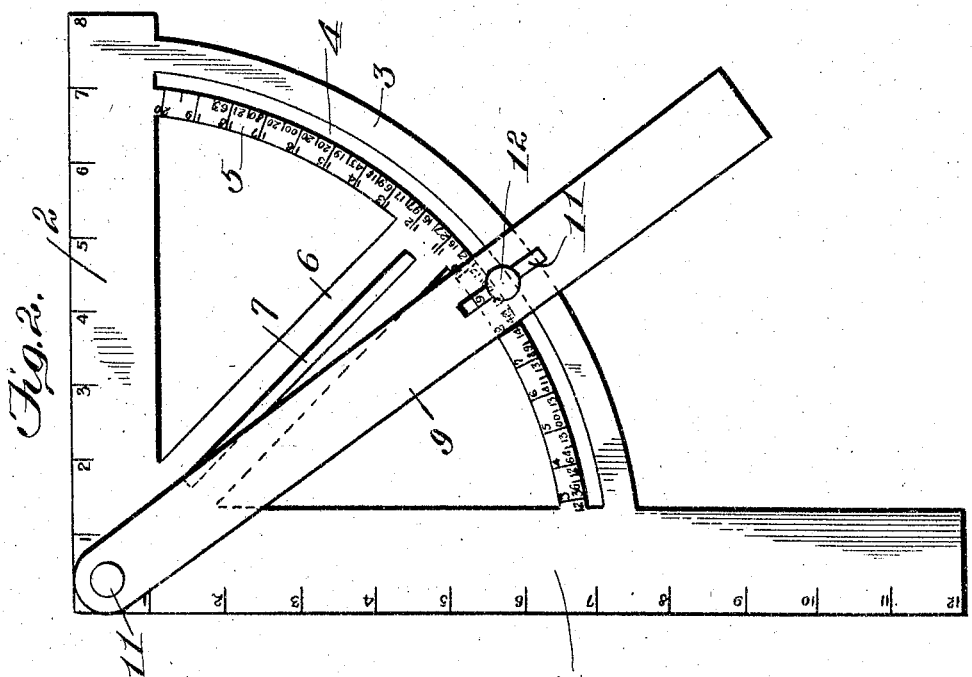
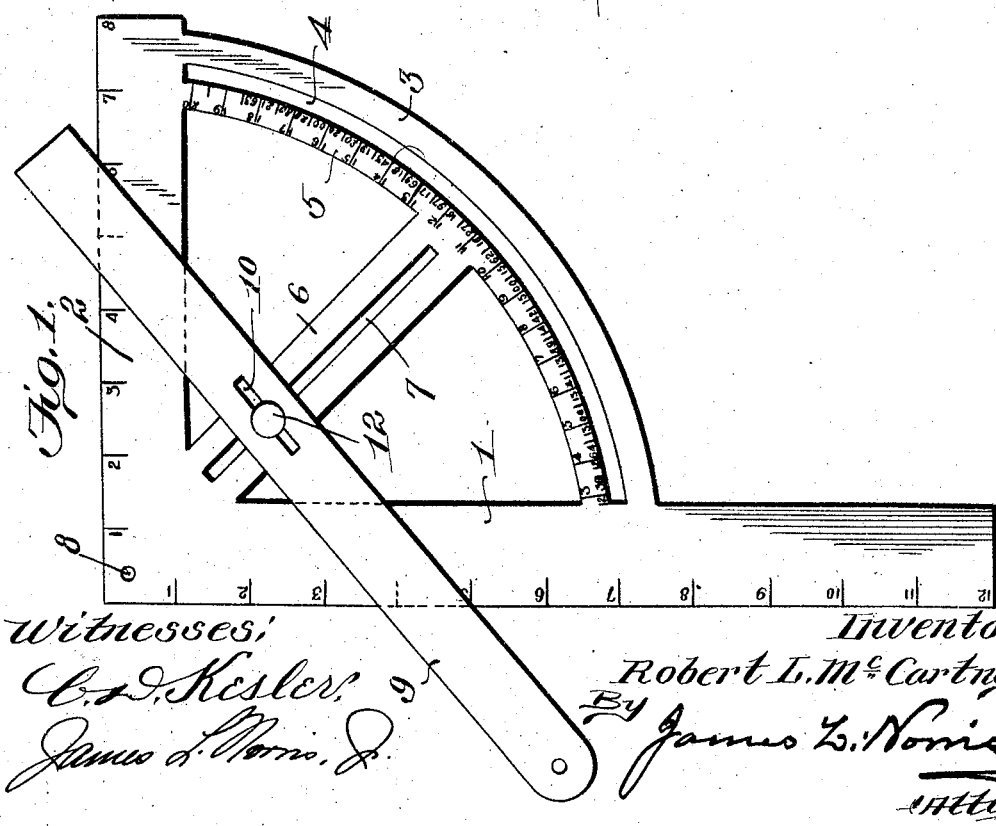
Witnesses:
C. D. Kesler
James L. Norris, Jr.
Inventor
Robert L. McCartney
By James L. Norris
Atty.

No. 780,954. PATENTED JAN. 24, 1905.
R. L. McCARTNEY.
COMBINATION MEASURING INSTRUMENT.
APPLICATION FILED APR. 5, 1904.

2 SHEETS—SHEET 2.

Witnesses:
C. D. Kesley
James L. Norris, Jr.

Inventor
Robert L. McCartney
By
James L. Norris
Atty.

No. 780,954. Patented January 24, 1905.

UNITED STATES PATENT OFFICE.

ROBERT L. McCARTNEY, OF OTTUMWA, IOWA, ASSIGNOR TO NICHOLLS MANUFACTURING COMPANY, OF OTTUMWA, IOWA, A COPARTNERSHIP UNDER THE LAWS OF IOWA.

COMBINATION MEASURING INSTRUMENT.

SPECIFICATION forming part of Letters Patent No. 780,954, dated January 24, 1905.

Application filed April 5, 1904. Serial No. 201,725.

*To all whom it may concern:*

Be it known that I, ROBERT L. MCCARTNEY, a citizen of the United States, residing at Ottumwa, in the county of Wapello and State of Iowa, have invented new and useful Improvements in Combination Measuring Instruments, of which the following is a specification.

This invention relates to certain new and useful improvements in implements for use by carpenters, builders, pattern-makers, and other mechanics, and has for its object to provide a measuring instrument or square which may be adapted for use in various connections in which the ordinary square as now constructed is not easily available.

In order that the invention may be thoroughly understood, I have illustrated the same in the accompanying drawings, in which—

Figure 1 is a plan view illustrating my invention as arranged for use in stair-building. Fig. 2 is a similar view showing the device as arranged for beveling the ends of rafters and for mitering generally, and Fig. 3 is a similar view showing the device as arranged for use as a try-square.

Referring now to the drawings, 1 indicates the body of the square, which is preferably a foot in length and provided with the usual lines of graduation down to, say, one-eighth of an inch. Extending at right angles to one end of the body is a tongue 2, preferably about eight inches in length and also suitably graduated in like manner as the body 1. Connecting the body 1 to the tongue 2 is a quadrant 3, provided throughout its length with a slot 4. The inner portion of this quadrant is suitably marked off to provide a scale 5 for a purpose to be presently described. Connecting the quadrant 3 and the square is an arm 6, having a longitudinal slot 7, said arm 6 extending from the angle of the square to the center of the quadrant 3 and being suitably secured to these members. Near its corner the square is provided with an aperture 8.

9 indicates a blade provided with a short longitudinal slot 10 and having in one end an aperture by means of which it may be pivotally connected to the square by means of a set-screw 11, secured on the aperture 8. In its use, as shown by Fig. 2, a set-screw 12 is passed through the slot 10 of the blade and adjustably secured in the slot 4 of the quadrant.

In the use of the device for ascertaining the angle at which to cut rafters in stair-building to form the rise and tread the set-screw 11 is removed and the blade 9 is adjustably secured on the arm 6 by means of the set-screw 11, which is passed through the slot 10 in the blade and the slot 7 in the arm 6, and as used in this connection, the blade 9 having been adjusted to the desired inclination, ascertained by the marks of graduation on the body and tongue, respectively, the device is placed in position with the blade extending plumb with one side of the girder or rafter, and the lines of cut are indicated on the rafter by a marking along two sides of the square projecting beyond the blade 9, as will be clearly understood by those skilled in the art.

For miter-working the device is assembled as previously described and as shown in Fig. 2, and in this application of the implement the body portion 1 is placed plumb with one line of the rafter or other piece to be cut and the bevel is indicated by the plate 9, which may be adjusted to any required degree less than a right angle, such inclination relative to the body 1 being indicated by the marks of graduation denoted by the scale 5. The scale of the quadrant 3 is also graduated to show the rise per foot, as in roof construction—that is to say, if it be desired to have a rise of eight inches to the foot the arm is placed at 8 on the quadrant. By placing the arm flush with one side of the rafter the base cut may be made from the body portion 1, and by then placing the arm flush with the opposite side of the rafter the top cut may be made from the tongue 2. At the same time the scale on the quadrant will show the length of the rafter for the first foot of rise—namely, as indicated on the scale, 14.42 inches. If the house be twenty feet wide, the length of the rafter would then be ten times 14.42 inches, or 144.20 inches. In this connection the device is specially serviceable in use in constructing the roofs of houses and in cutting the jack-rafters and similar applications, all of which will be apparent to the skilled constructor without further specification.

In the arrangement of the device shown in Fig. 3 the end of the blade 9 is adjustably secured by the set-screw 11 to the quadrant 3, and the blade is further adjustably secured to the square by means of the set-screw 12, inserted in the slot 10 of the blade and passed through the aperture 8 in the corner of the square. In this arrangement the portion of the blade projecting beyond the square enables the device to be used as a try-square, the marks of graduation on the quadrant indicating in any adjusted position of the blade the particular angle thereof relative to the body 1 or the tongue 2.

I have merely stated such uses of my device as will more readily be understood and such as will indicate its susceptibility for use in various applications. It will be apparent, however, that the several adjustments and arrangements of which the device is capable will enable the same to be employed with advantage in applications too numerous to mention.

It may be stated that I contemplate making all of the parts of the device of metal, and it will be apparent that the same can be economically constructed, as it is simple in construction and devoid of all complicated mechanism which would hinder its ready use in the ordinary trades and by an ordinary mechanic.

Having thus fully described my invention, what I claim as new, and desire to secure by Letters Patent of the United States, is—

1. A square comprising a body and a tongue, a slotted quadrant connecting the same, and a slotted blade pivotally connected to the square and adjustably secured to the quadrant through the two slots named.

2. A square comprising a body, a tongue and a slotted quadrant connecting the same, said square being provided with an aperture near its corner, and with a slotted arm extending from the angle of the square to said quadrant, in combination with a slotted blade having an aperture in one end, and set-screws, the combination operating as described.

3. In combination with a square comprising a body and tongue connected by a quadrant and an arm connecting said quadrant and said square, a blade, and means for detachably and adjustably connecting said blade to the square and the quadrant, or said arm, whereby to cause said blade to bear different relations in said respective connections to said square.

In testimony whereof I have hereunto set my hand in presence of two subscribing witnesses.

ROBERT L. McCARTNEY.

Witnesses:
BEN R. CRILEY,
MABEL M. MERRITT.